No. 673,130. Patented Apr. 30, 1901.
N. G. ROBERTSON.
ART OF MAKING SHOVELS.
(Application filed July 23, 1900.)
(No Model.)

WITNESSES:

INVENTOR:
Nathaniel G. Robertson,

UNITED STATES PATENT OFFICE.

NATHANIEL G. ROBERTSON, OF SCRANTON, PENNSYLVANIA.

ART OF MAKING SHOVELS.

SPECIFICATION forming part of Letters Patent No. 673,130, dated April 30, 1901.

Application filed July 23, 1900. Serial No. 24,488. (No specimens.)

*To all whom it may concern:*

Be it known that I, NATHANIEL G. ROBERTSON, a citizen of the United States, residing in Scranton, in the county of Lackawanna and State of Pennsylvania, have invented a certain new and useful Improvement in the Art of Making Shovels, whereof the following is a specification, reference being had to the accompanying drawings.

In the description and claim I use the term "shovel" as a convenient one to indicate the class of articles for which my invention is adapted, meaning of course to comprehend analogous implements, such as scoops and the like.

The object of my invention is to produce by electric welding an integral blank of such form that the shovel blade and straps can be made therefrom by rolling and shaping without further addition of material. The desirability of a blank of this character has heretofore been recognized, one advantage being that it permits the use of a relatively soft steel for the straps as compared with the material of the blade. Owing, however, to a lack of appreciation of the proper conditions for electrically welding the component parts of the blank the suggestions heretofore made have not, so far as I am aware, been practically successful.

In order to produce a blank whose sides are flush throughout, the portion intended for the straps (which I shall term the "strap-blank") must be butt-welded to the larger mass which is to form the blade and which I shall term the "blade-blank." After numerous experiments I have ascertained that with such electrical welding devices as are now known to the art the successful accomplishment of this step depends upon certain details of treatment. In the absence of these it is practically impossible to obtain a homogeneous and perfect joint between the strap-blank and the blade-blank, and when the attempt is made to roll and press an imperfect blank into the finished article this lack of integrity will be emphasized and a defective product will be obtained.

In the accompanying drawings I have illustrated the component parts of the blank and the various steps of the process.

Figure 5:
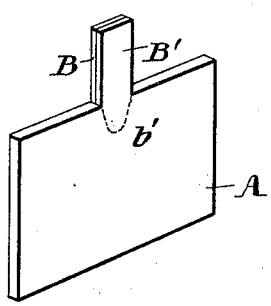
Figure 6:
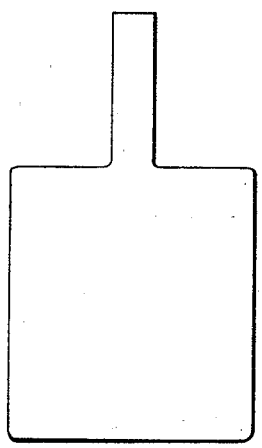
Figure 7:
Figure 8:
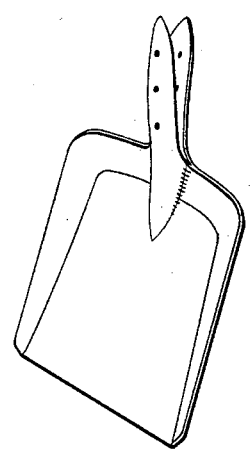

Figures 1 to 4, inclusive, are views in perspective of the various portions of the blank in the several stages which precede the welding. Fig. 5 is a view in perspective of the complete blank. Fig. 6 is a front view, and Fig. 7 an edge view, of the blank after it has been rolled into approximately the ultimate dimensions; and Fig. 8 is a view in perspective of the completed shovel.

I will now proceed to describe the process by reference to the various figures.

Figure 1:
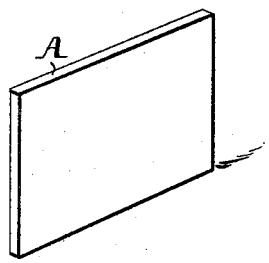
Figure 2:
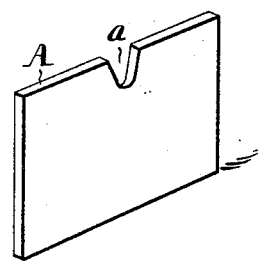
Figure 3:
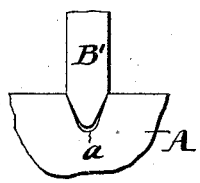
Figure 4:
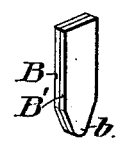

The initial blade-blank A is illustrated in Fig. 1; and it consists of a rectangular piece of steel, the dimensions of which will of course vary according to the size of the article to be produced. At the center of one of the longer edges I cut a notch $a$ entirely through the thickness of the blank. The outline of said notch must present a surface which converges toward the bottom thereof, and it is preferably formed with an elongated curve, as shown, although the curve may be the arc of a circle. The strap-blank is formed of two pieces B B', preferably of softer steel than the blade-blank, and each substantially one-half the thickness thereof. Said pieces have at one end a tapered or rounded configuration, as indicated at $b$, which fits closely against the sides of the notch $a$, but not against the extreme end or bottom thereof, the curvature or convergence of the strap-blank at its extremity being somewhat shorter than that of the notch at that region, so that if the parts be fitted together there would be a slight opening or interspace between the extremity of the strap-blank and the proximate face of the bottom of the notch, as shown in Fig. 3. The pieces B B' are placed in juxtaposition, as indicated in Fig. 4, with a thin layer of non-conducting material interposed to prevent their fusing together, and the composite strap-blank is then inserted in one member of the electric-welding apparatus and the blade-blank in the opposing member. The current being applied, the strap-blank is forced endwise into the notch $a$, the softened metal being crowded toward the extremity, so as to fill up the interspace due to the non-conformity of the end of the strap-blank with the bottom of the notch. At the completion of the welding operation the finished blank has the appearance of the blank shown in Fig. 5, the dotted lines $b'$ indicating the region of the weld, which, however, should be absolutely integral. The completed blank is then rolled out flat to the proper dimensions, as indicated in Fig. 6, and the strap-blank is opened out, as shown in Fig. 7. Thereafter, by the use of suitable pressing devices, the straps are finally shaped, and the blade of the shovel is finished, as shown in Fig. 8.

I am of course aware that it is not new to roll shovels from blanks, and I do not desire to claim this part of the process. I am also aware that it has been proposed to produce a shovel by the electrical welding of a strap-piece to a larger piece intended for the blade of the shovel, such a process being described in Letters Patent of the United States No. 488,503, dated December 20, 1892. The method set forth in that patent is, however, I believe, impracticable, owing to the fact that it is not feasible to properly weld a strap-piece of the character there shown to a blade-blank of the character there shown. The features to which I refer in said patent are, first, that an inclosed hole is formed in the blade-blank instead of a notch extending entirely through the thickness of the blank; second, that the ends of the two strap-pieces, with a relatively wide interspace between them, embrace said hole on opposite sides thereof, and, third, that a straight edge upon the end of the strap-piece is sought to be welded upon the straight outer edge of the blade-blank.

I believe that an integral blank cannot be practically made by such method, owing to the peculiar behavior of the metal under the conditions of butt-welding by electricity.

My process, as above set forth, differs in these essential particulars from the process set forth in said patent, and I therefore disclaim said patented process as not in any way exhibiting the specific features of novelty hereinafter claimed, upon which I believe that the success of the operation depends.

Having thus described my invention, I claim—

As an improvement in the art of making shovels, the process of forming a blank by cutting a notch completely through a blade-blank, the surface of said notch converging toward its bottom; forming a composite strap-blank of two pieces whose united thicknesses are substantially equal to the thickness of said blade-blank, said strap-blank having its end shaped to fit closely laterally, but not longitudinally, within said notch; electrically butt-welding said strap-blank to said blade-blank by forcing the strap-blank longitudinally into the notch, while under the influence of welding heat; and then rolling said blank and finishing the shovel, substantially as described.

NATHANIEL G. ROBERTSON.

Witnesses:
E. ELDRIDGE,
W. E. GUNSTER.